United States Patent [19]

Suganuma

[11] Patent Number: 5,159,223
[45] Date of Patent: Oct. 27, 1992

[54] DRIVING APPARATUS FOR ULTRASONIC MOTOR

[75] Inventor: Ryoichi Suganuma, Yokohama, Japan

[73] Assignee: Nikon Corporation, Tokyo, Japan

[21] Appl. No.: 666,713

[22] Filed: Mar. 8, 1991

[30] Foreign Application Priority Data

Mar. 15, 1990 [JP] Japan .................................. 2-65416

[51] Int. Cl.⁵ .............................................. H01L 41/08
[52] U.S. Cl. ...................................... 310/316; 318/116
[58] Field of Search ................. 310/316, 317; 318/116

[56] References Cited

U.S. PATENT DOCUMENTS

| | | | |
|---|---|---|---|
| 4,560,263 | 12/1985 | Katsuma et al. | 310/317 X |
| 4,794,294 | 12/1988 | Shimizu et al. | 310/316 |
| 4,812,699 | 3/1989 | Ogawa | 310/316 |
| 4,914,337 | 4/1990 | Takagi | 310/316 |
| 4,926,084 | 5/1990 | Furutsu et al. | 310/316 |
| 4,954,742 | 9/1990 | Izukawa | 310/316 |
| 4,998,048 | 3/1991 | Furutsu | 318/116 |
| 5,010,222 | 4/1991 | Suganuma | 318/116 |
| 5,023,526 | 6/1991 | Kuwabara | 318/116 |

FOREIGN PATENT DOCUMENTS 59-111609 6/1984 Japan .

*Primary Examiner*—Mark O. Budd
*Attorney, Agent, or Firm*—Shapiro and Shapiro

[57] ABSTRACT

A driving apparatus for an ultrasonic motor comprises a stator that generates progressive oscillating waves in an elastic body by excitation of a piezoelectric body; a mover that is rendered in contact with said stator by a pressing element so that it is driven by said progressive oscillating waves; a device for producing a signal for steady period, which generates a signal for steady driving; a transient period signal generating device, which generates a driving signal for transient periods; and a switching device which is placed between said ultrasonic motor and said both signal generating devices and which selectively switches the connection between said ultrasonic motor and said two signal generating devices so that said driving signal for transient periods is applied to said ultrasonic motor in said transient state, while said steady driving signal is applied to said ultrasonic motor in said steady operation state. The ultrasonic motor is driven in accordance with said steady driving signal in a steady state, while the ultrasonic motor is driven in accordance with said driving signal for transient periods in a transient state.

5 Claims, 7 Drawing Sheets

F I G. 2
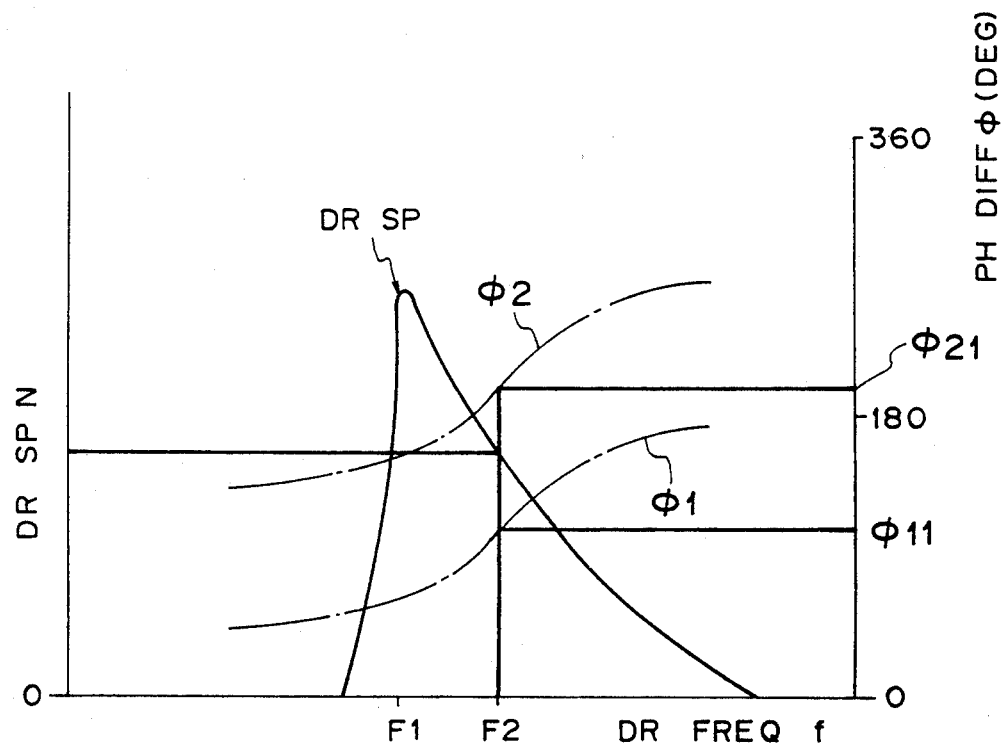

DRIVING APPARATUS FOR ULTRASONIC MOTOR

BACKGROUND OF THE INVENTION

1. Field of the Invention

The present invention relates to a driving apparatus for ultrasonic motors, which is designed to drive a mover by means of the progressive oscillating waves produced in an elastic body by a piezoelectric body.

2. Related Background Art

An ultrasonic motor utilizing progressive oscillating waves is, as disclosed in Japanese Patent Application laid-Open No. 59-111609, a motor in which AC driving voltage is applied to a piezoelectric body to produce flexure oscillation in said piezoelectric body. This, in turn, produces progressive oscillating waves in an elastic body to which said piezoelectric body is attached, and a mover is pressed to come in contact with the elastic body, thus driving the motor by friction.

FIG. 6 is a cross-sectional view showing the outline of the configuration of a rotary ultrasonic motor, and FIG. 6 is a plan view of the ultrasonic motor observed from the piezoelectric body side.

Referring to the ultrasonic motor shown in FIGS. 6 and 7, a piezoelectric body 1004 is attached to one side surface of an elastic body 1003. The elastic body 1003 and the piezoelectric body 1004 constitute an oscillating body 120. A rotor 1001 is in contact under pressure with the other side surface of the elastic body 1003 through a slider 1002. The slider 1002 and the rotor 1001 are glued together, constituting a rotor 110.

The surface of piezoelectric body 1004 is provided with four electrodes and electrode groups, 1004a, 1004b, 1004c and 1004d as shown in FIG. 7. The driving electrode groups 1004a and 1004b are subjected to AC driving voltages which differ from each other in phase by $\pi/2$. The electrode 1004c is grounded. The electrode 1004d is used to take out an AC output voltage which corresponds to the oscillation of the oscillating body 120. Such conventional driving controlling device (1) controls the frequency of an AC driving voltage signal by the voltage value obtained from the monitoring electrode 1004d, or (2) controls the frequency of the AC driving voltage signal by the phase difference produced between the signal waveform of the AC voltage applied to the piezoelectric body 1004 and the voltage signal waveform issued from the monitoring electrode 1004d.

The ultrasonic motor, however, presents unstable operating characteristics during a transient period, and its monitoring electrode also produces unstable output voltage during the transient period. Transient periods here include the time when the ultrasonic motor is started, the time when the speed of the motor is changed while the motor is running, and the time when the rotating direction is reversed while the motor is running. To control the drive of the ultrasonic motor during such transient period, if the driving conditions are controlled according to the output voltage and output voltage waveform of the monitoring electrode, then the ultrasonic motor may present problems such as unstable operation or a failure to start.

The reasons set forth below are considered to be responsible for the unstable phenomena of the ultrasonic motor during such transient periods.

FIG. 2 shows the operational characteristics of the ultrasonic motor. The abscissa gives a driving frequency f, and the ordinate provides driving speed N and the phase difference $\phi$ produced between the waveform of the driving voltage applied to the driving electrode 1004a and the output voltage waveform of the monitoring electrode. In the figure, $\phi1$ and $\phi2$ depict the characteristic of the phase difference in each driving direction. With the driving voltage waveform of the driving electrode 1004b as the reference, if the driving direction is taken, for example, as the forward rotating direction when the phase of the driving voltage waveform of the driving electrode 1004a advances $\pi/2$, and if the characteristic of the phase difference is represented by $\phi1$, then the reverse rotation results when the phase of the driving voltage waveform of the driving electrode 1004a delays $\pi/2$, and the characteristic of the phase difference is represented by $\phi2$. F1 in the figure denotes the resonance frequency of the ultrasonic motor. The driving speed of the ultrasonic motor can be changed by changing the driving frequency f. Normally, the frequency band used for the driving control is higher than the resonance frequency F1 but its band width is 10 to 15% narrower than the resonance frequency F1. As illustrated, at frequencies in the vicinity of or lower than the resonance frequency F1, a slight change in frequency causes a significant change in the driving speed, resulting in unstable operation. If the frequency goes down further, the driving control cannot be achieved.

On the other hand, at frequencies higher than the driving frequency band, unstable operation phenomena such as a reversed driving direction is observed. In addition to the cause related to the driving frequency, a change in the driving voltage may also lead to unstable operation. Further, the operation may become unstable during a transient period when the rotational direction of the ultrasonic motor is reversed while it is running. This is considered attributable to a change in the operating characteristic of the ultrasonic motor that takes place when the rotational direction is switched, and also to the transient phenomenon caused by the switching of the phase of the driving voltage applied to the driving electrode.

Next, the output voltage of the monitoring electrode during the transient period is discussed.

FIG. 8 is a time chart which shows the output voltage of the monitoring electrode when the ultrasonic motor is started with the driving voltage and the driving frequency fixed at constant levels. When the ultrasonic motor is started with the driving voltage applied to the driving electrode at a time t1, the output voltage of the monitoring electrode gradually increases and reaches a constant voltage after a time t2. As shown in the figure, during the period from the time t1 immediately after the start to the time t2, the output voltage of the monitoring electrode is in the transient state and presents a voltage value which is different from that in the stabilized state after the time t2.

The phase difference between the driving voltage waveform of the driving electrode and the output voltage waveform of the monitoring electrode also shows a transient unstableness at the time of start. Immediately after start, in particular, a significant error is produced in the detection of the phase difference because the output voltage of the monitoring electrode is low as shown in FIG. 8.

Such transient phenomenon observed in the monitoring electrode is considered to result from the equivalent impedance of the ultrasonic motor, which changes depending on whether the motor is at rest or in the running state, causing the resonance frequency to change. There is another possible cause; if a transformer is used for the power amplifier which supplies the driving voltage to the ultrasonic motor or if a coil is connected to the driving electrode, then a transient phenomenon is considered to take place between the capacitance of the piezoelectric element of the driving electrode and the transformer or coil inductance when the driving voltage changes.

Thus, if the ultrasonic motor is controlled during such transient period according to the unstable output voltage of the monitoring electrode, then the driving frequency cannot be set within the driving frequency band wherein stable operation can be accomplished. As a result, the driving frequency turns into an unstable driving frequency as discussed above, causing the ultrasonic motor to exhibit unstable operation.

SUMMARY OF THE INVENTION

An object of the present invention is to provide stable operation of the ultrasonic motor even during a transient period by controlling the driving conditions of the ultrasonic motor.

The present invention will now be described with reference to FIG. 1 which shows an embodiment of the invention. The present invention applies to a driving device used for an ultrasonic motor consisting of a stator which generates progressive oscillating waves in an elastic body by the excitation of a piezoelectric body, and a mover which is kept in contact with the stator by a pressing means to be driven by the progressive oscillating waves. In particular, it applies to an ultrasonic motor driving device which has steady signal generating means 14, 15, 16 and 17 for producing the driving signals for an ultrasonic motor to drive the ultrasonic motor under the present driving conditions.

The technical object discussed above is fulfilled by providing transient signal generating means 23 and 33 for producing the driving signals ideally suited for a transient period of the ultrasonic motor, and switching means 21, 22, 31 and 32 which function to switch between two different signal generating means so that the driving signals generated by the transient signal generating means 23 and 33 are applied to the ultrasonic motor during a transient period while the driving signals generated by the steady signal generating means 14, 15, 16 and 17 are applied to the ultrasonic motor during a steady period.

Alternatively, with the starting of the ultrasonic motor set as a transient period, the transient signal generating means 23 may be designed to generate a driving signal suited for starting the ultrasonic motor; or with the moving direction switching time of the ultrasonic motor set as the transient period, the transient signal generating means 33 may be designed to generate a driving signal suited for such switching.

During a steady period, the switching means 21, 22, 31 and 32 select appropriate driving signals, which are issued by the steady signal generating means 14, 15, 16 and 17 according to the preset driving conditions, to control the drive of the ultrasonic motor.

When the ultrasonic motor is started or when its rotational direction is reversed, the switching means 21, 22, 31 and 32 select the driving signals which are suited for such transient periods and which are produced by the transient signal generating means 23 and 33 to control the drive of the ultrasonic motor.

The disclosed embodiment is intended to provide easy understanding of the configuration of the present invention. However, the present invention is not limited to the embodiment.

BRIEF DESCRIPTION OF THE DRAWINGS

FIG. 2 shows the operation characteristics of the ultrasonic motor,

DESCRIPTION OF THE PREFERRED EMBODIMENTS

Figure 1:
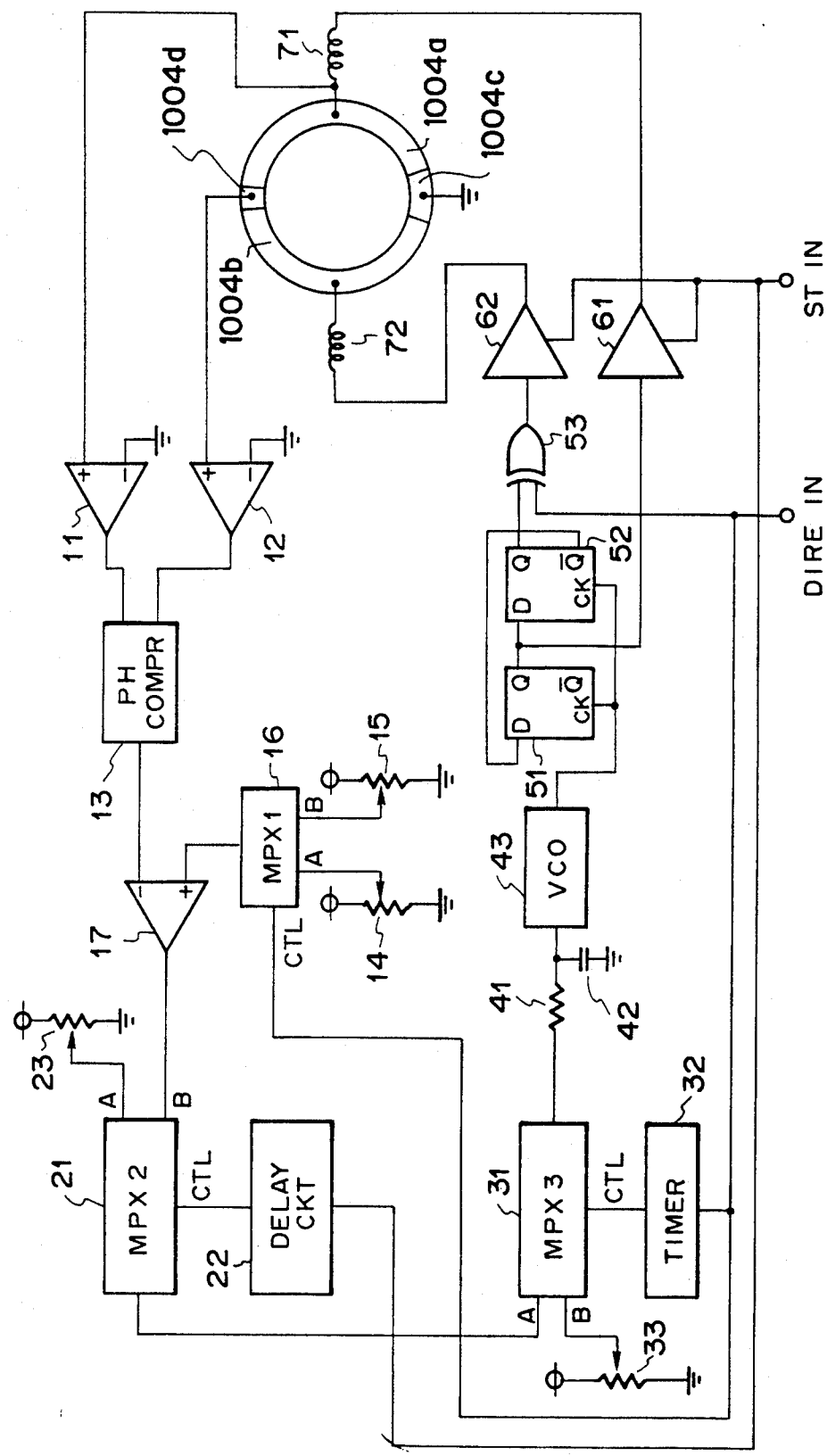
FIG. 1 is a block diagram showing an embodiment of the present invention.

FIG. 1 is a block diagram which shows a preferred embodiment of the present invention. The embodiment shows an example in which the driving frequency is controlled so that the phase difference between the driving voltage waveform and the output voltage waveform of the monitoring electrode provides a specified phase difference. For instance, the driving frequency is controlled so that the phase differences of the driving voltage in the individual motor running directions provide $\phi 11$ and $\phi 21$, respectively as shown in FIG. 2. In this case, the driving frequency is F2, and the driving speed is N as illustrated in the drawing.

In the FIG. 1, 11 and 12 are waveform shapers which are connected to the driving electrode 1004a of the ultrasonic motor and the monitoring electrode 1004d to shape the driving voltage waveform of the ultrasonic motor and the output voltage waveform of the monitoring electrode into square waveforms of the required voltage levels. Further, 13 is a phase comparator which compares the output of the waveform shaper 11, that is, the driving voltage waveform of the driving electrode 1004a of the ultrasonic motor, with the output of the waveform shaper 12, that is, the output voltage waveform of the monitoring electrode, to detect the phase difference and then it outputs the detected phase difference in terms of a voltage value.

Figure 3:
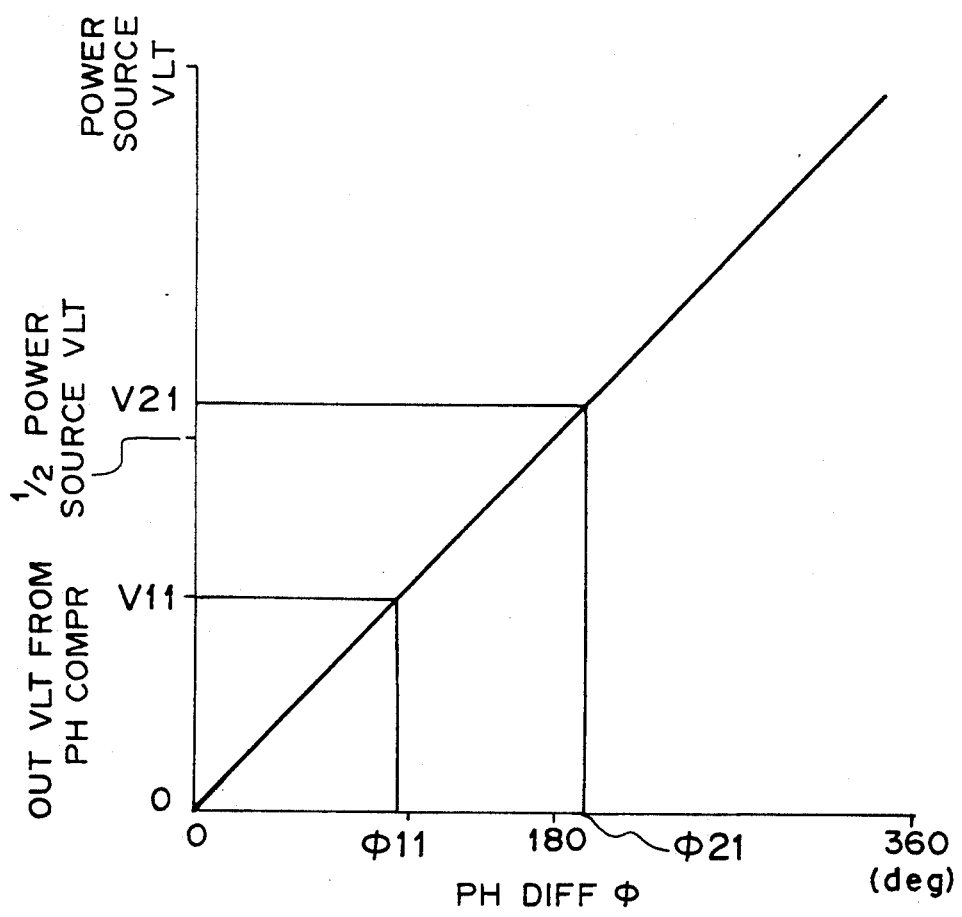
FIG. 3 shows the output voltage characteristics of a phase comparator.

FIG. 3 shows the characteristics of the phase comparator 13 which is explained below:

The ordinate provides the output voltage of the phase comparator 13, and the abscissa provides the phase difference between the driving voltage waveforms and the output voltage waveforms of the monitoring electrode. In the chart, $\phi 11$ and $\phi 21$ are the phase differences produced when the motor runs in the forward direction and reverse direction, respectively. The phase comparator 13 produces the signals having the characteristic shown in FIG. 3 in response to the phase difference $\phi$.

In FIG. 1, 14 and 15 are the setting devices for setting the reference phase differences $\phi 11$ and $\phi 21$ in the forward and reverse rotational directions, respectively. Their output voltages are supplied to input terminals A and B of the signal selector (MPX1) 16. A control terminal CTL of the signal selector (MPX1) receives a signal of direction input. If the level of said signal is low, then the reference phase difference signal set by the setting device 14 of the input terminal A is selected. If the signal level is high, then the reference phase difference signal set by the setting device 15 of the input terminal B is selected. 17 is an error amplifier which compares the reference phase difference signal selected by the signal selector (MPX1) 16 with the output voltage of the phase comparator 13, and amplifies the difference.

A signal selector (MPX2) 21 selects the output voltage of the error amplifier 17, which is supplied to the input terminal B, when the level of the signal at the control terminal CTL is high. When the signal level is low, then the signal selector selects the driving signal for starting the ultrasonic motor, which is set by the setting device 23 and supplied to the input terminal A, and sends the signal to a signal selector (MPX3) 31 to be discussed later. The control terminal CTL receives the output signal of a delay circuit 22. When the starting input signal switches from the low level to high level at the time of starting the motor, the delay circuit 22 delays the output by a specified time T1. In other words, the driving signal from the setting device 23 is selected for the specified time T1 at the time of start.

In response to the level of the signal sent from a timer 32 into the control terminal CTL, the signal selector 31 (MPX3) selects and issues the output signal given by the signal selector (MPX2) 21 of the input terminal A or the driving signal for switching the driving direction of the ultrasonic motor set by the setting device 33 of the input terminal B.

Figure 4A:
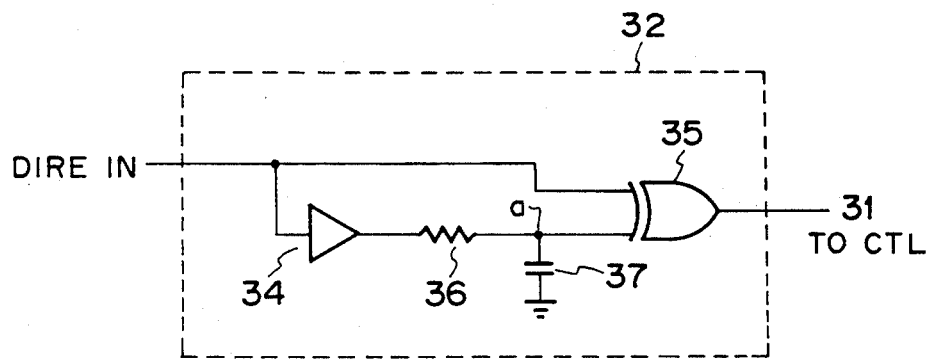
FIGS. 4A and 4B show the detailed circuit diagram of a timer and a time chart of the operation.
Figure 4B:
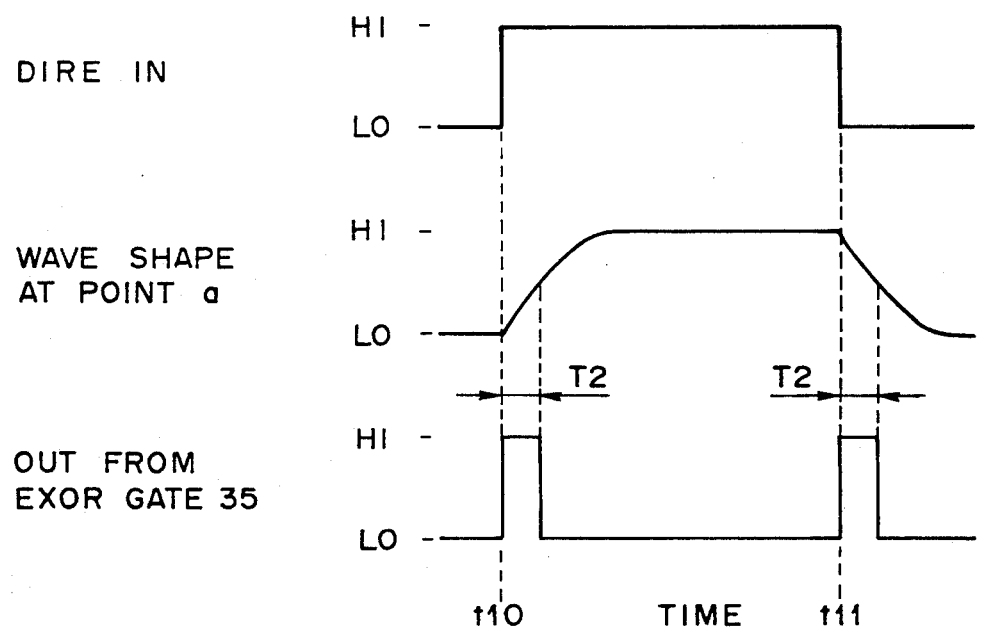

FIG. 4A shows the detailed circuit of the timer 32, and FIG. 4B shows its operation time chart.

The timer 32 consists of a buffer amplifier 34, an EXOR gate 35, a resistor 36 and a capacitor 37. The direction input signal is connected to the input of the buffer amplifier 34 and the input of the EXOR gate 35 in parallel. When the direction input signal shifts from the low to high level at a time t10, the direction input signal which goes through the buffer amplifier 34 is picked up from the input of the EXOR gate 35, then it is delayed by the delay circuit comprising the resistor 36 and the capacitor 37. As a result, the waveform at point "a" shown in FIG. 4A will be as shown in FIG. 4B. The EXOR gate 35 switches the output to the high level only when one of the inputs is high level, therefore, the output is maintained at high level only for a time T2 determined by the resistor 36 and the capacitor 37. Similarly, the output of the EXOR gate 35 is maintained at high level only for the time T2 at a time t11 when the direction input signal switches from high level to low level. Thus, the timer 32 switches its output to high level only for the specified time T2 when the direction input signal changes.

In FIG. 1, a resistor 41 and a capacitor 42 constitute a low-pass filter used to supply the output signal of the signal selector (MPX3) 31, i.e., the driving signal of the ultrasonic motor, to a voltage control oscillator (hereinafter referred to as "VCO"). The VCO 43 issues a signal of a frequency in proportion to the voltage level of an input signal. The frequency is set for four times the specified frequency because it is divided down to one fourth through D flip-flops 51 and 52 to be discussed later.

The D flip-flops 51 and 52 receive the frequency signal from the VCO 43 to a clock input terminal CK, and they are designed at divide the frequency to one fourth. The output of the D flip-flop 51 is connected to the driving electrode 1004a through a power amplifier 61 and an inductive element 71. The output of the D flip-flop 52 is connected to one input terminal of an EXOR gate 53. Direction input signals are connected to the other input terminal of the EXOR gate 53, and the output is connected to the driving electrode 1004b through a power amplifier 62 and an inductive element 72.

When the direction input signal is at low level, then the output of the D flip-flop 52 is directly amplified by the power amplifier 62 and applied to the driving electrode 1004b. Therefore, the driving voltage waveform of the driving electrode 1004a is ahead of the driving voltage waveform of the driving electrode 1004b by $\pi/2$ in phase. In contrast with that, when the direction input signal is at high level, the output of the D flip-flop 52 is reversed by the EXOR gate 53, so that the driving voltage waveform of the driving electrode 1004a is behind the driving voltage waveform of the driving electrode 1004b by $\pi/2$ in phase. The power amplifiers 61 and 62 produce outputs only when the starting input signal is at high level.

The operation of the driving device of the ultrasonic motor thus configured is discussed below.

When starting the ultrasonic motor, the start input signal is sent to the delay circuit 22. The delay circuit 22 delays the starting signal for a specified time T1 during which the input A of the signal selector (MPX2) 21, i.e., the setting voltage of the setting device 23 for establishing the driving conditions at the time of starting, is selected. At the time of starting, the control terminal CTL of the signal selector (MPX3) 31 is at low level, and the signal selector (MPX3) selects the A input. As a result, the setting voltage signal of the setting device 23 is supplied to the VCO 43 through the signal selector (MPX3) 31 and the low-pass filter (the resistor 41 and the capacitor 42).

The VCO 43 produces a frequency signal which corresponds to the voltage signal, and sends it out to the D flip-flops 51 and 52. The frequency signal is divided down to a quarter through the D flip-flops 51 and 52, then it goes through the EXOR gate 53 to generate two frequency signals which have a phase difference of $\pi/2$ from each other. The frequency signals are amplified by the power amplifiers 61 and 62 before they are applied to the driving electrodes 1004a and 1004b through the inductive elements 71 and 72.

If, for instance, the driving direction when the direction input signal is at low level is forward, then the waveform of the driving voltage applied to the driving electrode 1004a is ahead of the driving voltage waveform of the driving electrode 1004d by $\pi/2$ in phase as discussed previously.

Thus, the ultrasonic motor is started under the optimum driving conditions for starting set by the setting device 23. When the delay time T1 of the delay circuit 22 elapses, the delay circuit output switches to high level, causing the signal selector (MPX2) 21 to select the input B, i.e., the signal from the error amplifier 17. In other words, the ultrasonic motor shifts to the steady operation from that point.

Now, the operation of the ultrasonic motor in the steady period is explained.

During the steady operation, the phase difference $\phi$ of the output voltage waveform of the monitoring electrode 1004d (the output of the waveform shaper 12)

from the reference output voltage waveform of the driving electrode 1004a (the output of the waveform shaper 11) is calculated by the phase comparator 13, then the signal is supplied to the error amplifier 17. The other input terminal of the error amplifier 17 receives the signals from the signal selector (MPX1) 16. When the direction input signal applied to the control terminal CTL of the signal selector (MPX1) 16 is at low level, i.e., when the motor runs in the forward direction, the signal of the reference phase difference $\phi 11$ set by the setting device 14 is selected, while the reference phase difference $\phi 21$ set by the setting device 15 is selected when the motor runs in the reverse direction. Thus, the error amplifier 17 outputs the difference between the voltage corresponding to the phase difference of the running ultrasonic motor, which is applied by the phase comparator 13, and the voltage set by the reference phase difference setting device 14 or 15.

During the steady operation, the signal selector (MPX2) 21 selects the input B, while the signal selector (MPX3) 31 selects the input A, and therefore, the output of the error amplifier 17 is supplied to the VCO43 through the low-pass filter (the resistor 41 and the capacitor 42). The signal is converted to a frequency signal by the VCO43 according to the procedure described above, then divided to a quarter by the D flip-flops 51 and 52. The outputs from the D flip-flops 51 and 52 are converted, through the EXOR gate 53, into two frequency signals whose phases differ from each other by $\pi/2$ before they are applied to the driving electrodes 1004a and 1004b through the power amplifiers 61 and 62, and the inductive elements 71 and 72.

During the steady operation, the drive of the ultrasonic motor is controlled with the feed-back loop described above so that the phase difference during operation is equivalent to the reference phase difference.

During the steady running in the reverse direction, the drive is controlled in the same way as that in the above-mentioned operation in the forward direction except that the reference phase difference signal set by the setting device 15 is selected. For this reason, no further explanation is given.

Next, the operation when the direction input is switched is described. For instance, assuming that the ultrasonic motor is running in the forward direction in the steady period, if the direction input signal level changes to high level, causing the command for reverse rotation to be sent to the signal selectors 16 and 31 and the EXOR gate 53, then the output of the timer 32 changes to high level, and the signal selector (MPX3) 31 selects the input B. In other words, the setting voltage of setting device 33, which establishes optimum driving conditions at the time of the transient period when the driving direction is switched, is selected. The signal is sent out to the VCO43 through the low-pass filter (the resistor 41 and the capacitor 42) only for the time T2, and after that, the ultrasonic motor is driven in the same procedure as described previously in accordance with that signal. After the time T2, the output of the timer 32 goes back to low level, and the signal selector (MPX3) 31 selects the input A. The setting device 15 for the time of reverse rotation has already been selected by the signal selector (MPX1) 16 when the direction input signal changes to high level, and therefore, the ultrasonic motor is controlled in accordance with the difference between the voltage set by the setting device 15 and the output voltage of the phase comparator 13.

When the direction input signal changes from high level to low level, the signal selector (MPX1) 16 selects the voltage signal of the setting device 14. Further, the output of the timer 32 changes to high level, and the signal selector (MPX3) 31 selects the voltage signal set by the setting device 33. Thus the drive of the ultrasonic motor is controlled under the optimum driving conditions when the driving direction is switched. After the time T2, when the output of the timer 32 goes back to low level again, then the signal selector (MPX3) 31 selects the input A, so that the ultrasonic motor is controlled as previously described in accordance with the voltage signal of the setting device 14 which sets the reference phase difference $\phi 11$ for the forward rotation.

As described above, the ultrasonic motor can be started without being affected by the output voltage of the monitoring electrode, which fluctuates at the time of starting of the motor. And consistent start of the ultrasonic motor can be achieved by prohibiting the drive control over the ultrasonic motor based on the control signal for the phase difference of steady operation only for the delay time T1 of the delay circuit 22 at the time of starting but by controlling the drive in accordance with the signal for the optimum driving conditions for starting the ultrasonic motor set by the setting device 23.

Similarly, the driving direction of the ultrasonic motor can be switched without fluctuation by prohibiting the drive control over the ultrasonic motor based on the control signal of the phase difference for the steady operation only for the duration T2 set by the timer 32, but by controlling the drive in accordance with the driving condition signal for achieving optimum reversal of the ultrasonic motor rotation, which is set by the setting device 33.

In the present embodiment, the setting devices 23 and 33 function to set optimum driving conditions as fixed values for the starting the motor and for reversing the driving direction. It is not required, however, to control the drive in accordance with the fixed driving conditions. Instead, the driving frequency may be changed from a high frequency to a low frequency by changing the setting voltages of the setting devices 23 and 33 from a high level to a low level.

Figure 5:
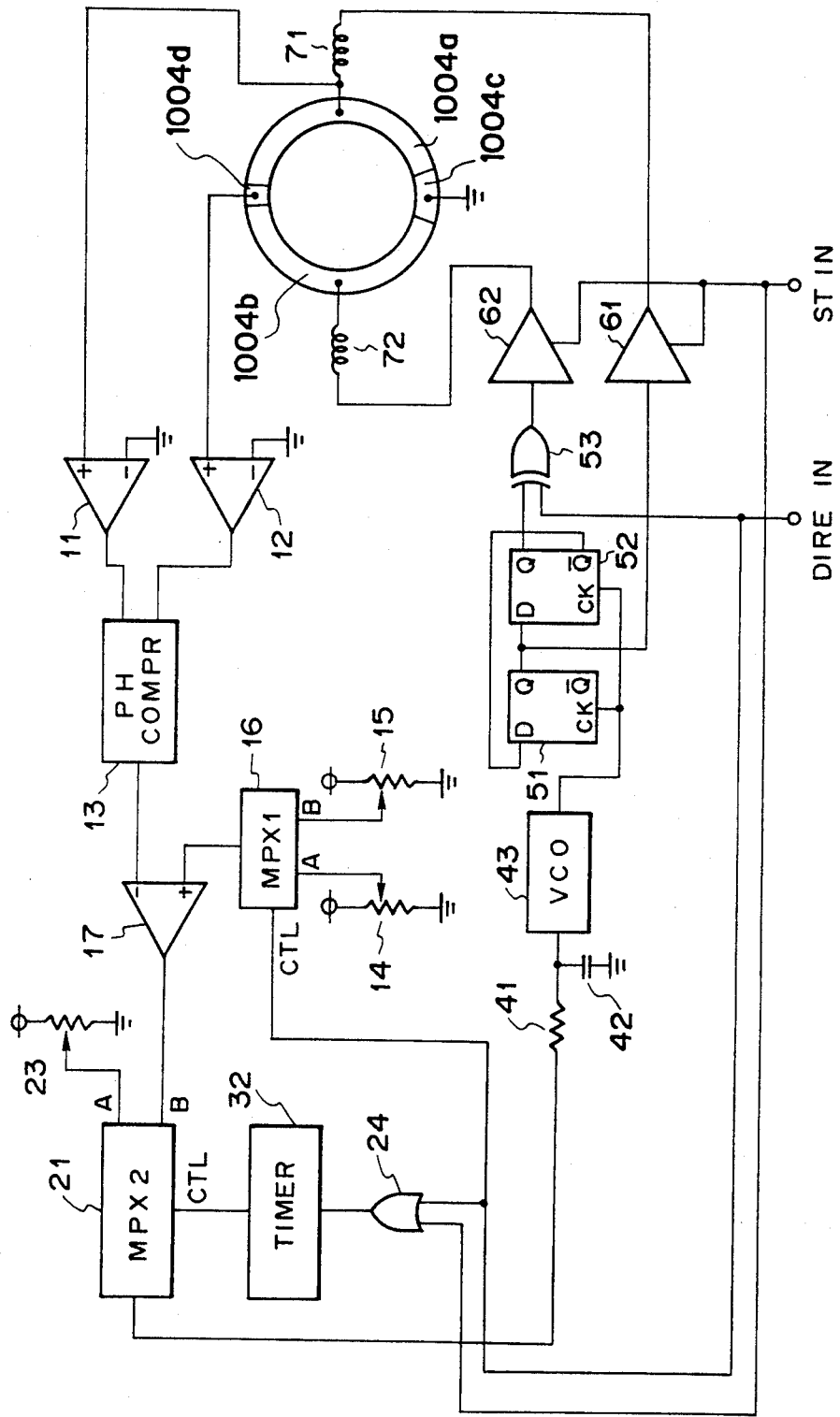
FIG. 5 is a block diagram showing a variation of the embodiment shown in FIG. 1.
Figure 6:
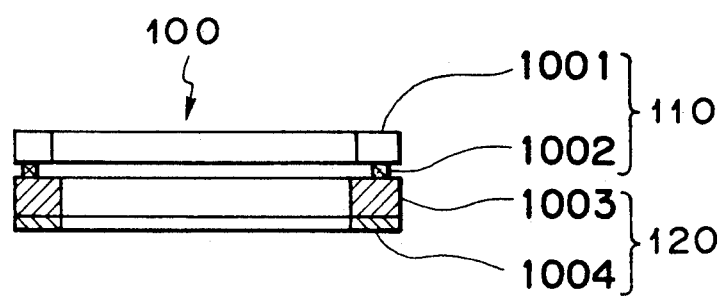
FIG. 6 is a cross-sectional view of the outline of configuration of the rotary type ultrasonic motor.
Figure 7:
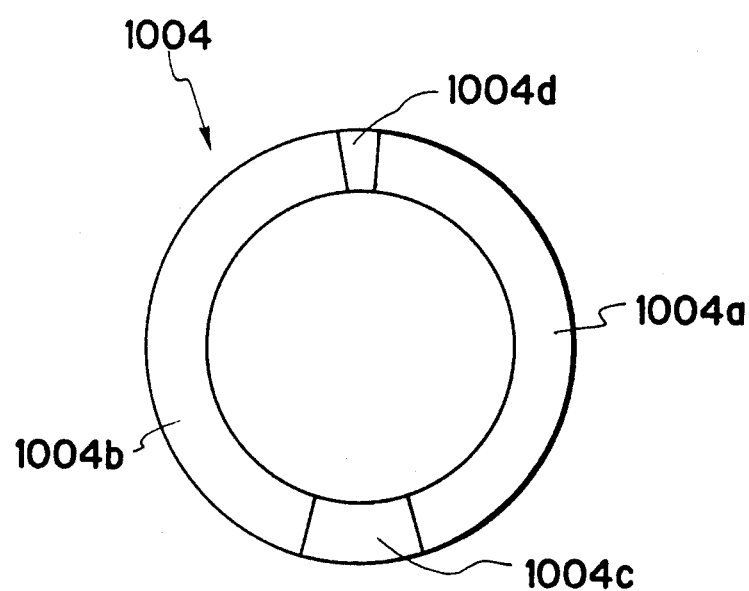
FIG. 7 is a plan view of the ultrasonic motor observed from the piezoelectric body side.
Figure 8:
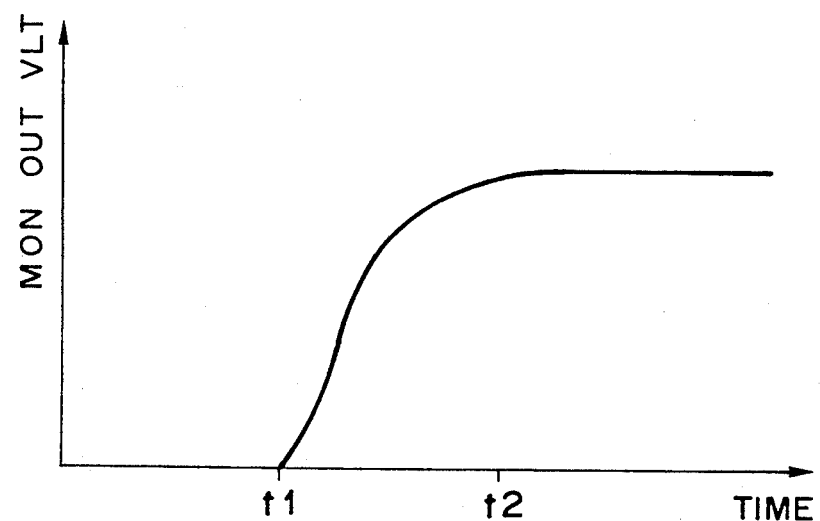
FIG. 8 shows the output voltage characteristics of the monitoring electrode of the ultrasonic motor.

If the driving conditions for starting the motor and those for reversing the rotational direction are almost the same, then the timer 32, the signal selector (MPX3) 31 and the setting device 33 may be omitted, the delay circuit 22 may be replaced by the timer 32, and the timer 32 may be connected in parallel to the starting input with the direction input through the OR gate 24 as shown in FIG. 5, so that the setting device 23 can be used for both starting the motor and reversing the driving direction.

Alternatively, the ultrasonic motor may be brought to a halt for a certain time when the direction is switched, and then the motor may be restarted. In this case, from the moment the motor is restarted, the drive of the ultrasonic motor is controlled under the above-mentioned driving conditions.

Further, the embodiment described above provides an example where the driving frequency of the ultrasonic motor is controlled to obtain the desired speed value. The present invention can also be applied to a case where the driving voltage is controlled to obtain the desired speed value. The present invention can similarly be applied to a linear type ultrasonic motor.

In the configuration of the embodiment presented above, the setting devices 14 and 15, the signal selector (MPX1) 16 and the error amplifier 17 configure the signal generating means for the steady period; the signal selectors 21 and 31, the delay circuit 22 and the timer 32 configure the switching means.

As described so far, according to the present invention, the driving signal for ensuring optimized drive control over an ultrasonic motor is generated during a transient period. And a switching circuit switches from the driving signal for steady operation to the driving signal for the transient period to successfully control the motor drive, thus assuring consistent drive of the ultrasonic motor.

I claim:

1. A driving apparatus for an ultrasonic motor, which includes a stator that produces progressive oscillating waves in an elastic body by the excitation of a piezoelectric body, and a mover that is attached under pressure to said stator to be driven by said progressive oscillating waves, said elastic body having a monitor electrode which produces a monitor signal corresponding to the oscillation of said stator, said driving apparatus comprising:

steady driving signal producing means for producing a steady driving signal, for driving said ultrasonic motor in a steady state, on the basis of said monitor signal;

transient driving signal producing means for producing a transient driving signal, for driving said ultrasonic motor in a transient state, irrespective of said monitor signal; and switching means for selecting one of said steady driving signal and said transient driving signal so that said ultrasonic motor is driven in the state corresponding to said selected driving signal.

2. A driving apparatus for an ultrasonic motor according to claim 1 further comprising timer means for measuring a predetermined time from a moment when said ultrasonic motor is started and producing a timer signal when said predetermined time has elapsed, wherein said switching means selects said transient driving signal before the production of said timer signal and selects said steady driving signal in response to said timer signal.

3. A driving apparatus for an ultrasonic motor according to claim 1, wherein the running direction is changeable, further comprising timer means for measuring a predetermined time from a moment the running direction of said ultrasonic motor is changed and producing a timer signal when said predetermined time has elapsed, wherein said switching means selects said transient driving signal before the production of said timer signal and selects said steady driving signal in response to said timer signal.

4. A driving apparatus for an ultrasonic motor according to claim 1, wherein said ultrasonic motor is in said transient state when started, said driving signal for a transient state being produced by a signal for starting said ultrasonic motor.

5. A driving apparatus for ultrasonic motor according to claim 1, wherein the running direction is changeable;

wherein said ultrasonic motor is in said transient state when its running direction is changed, and said driving signal for a transient period being produced by a signal for changing the running direction of said ultrasonic motor.

* * * * *